Nov. 15, 1932.     T. H. WILSON     1,888,101
METHOD AND APPARATUS FOR COATING PIPE WITH PLASTIC COMPOSITION
Filed Oct. 14, 1931     3 Sheets-Sheet 3
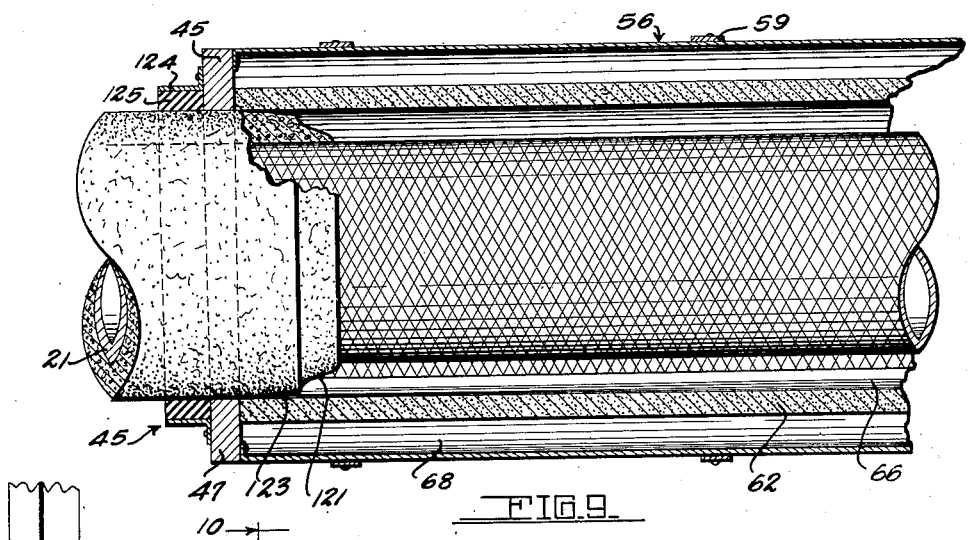
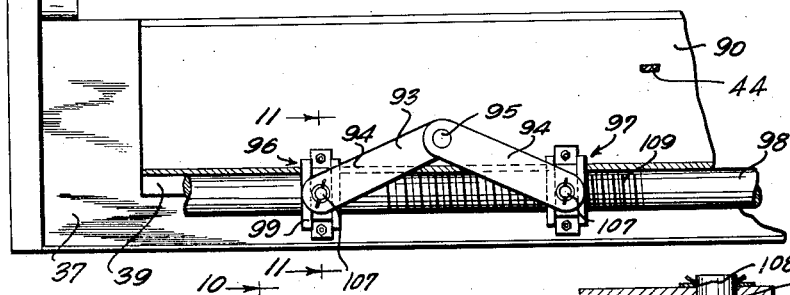
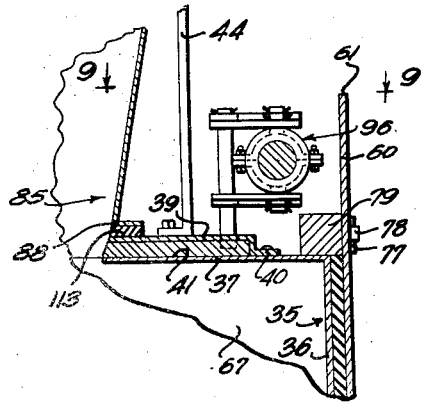
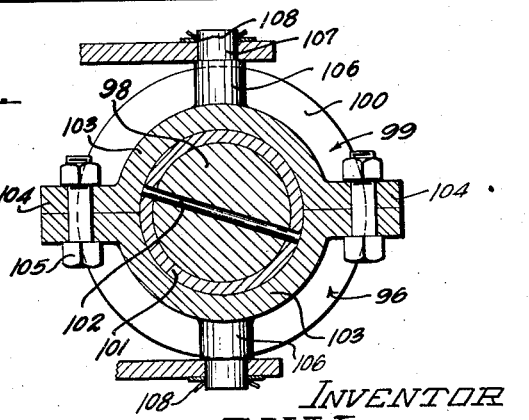
INVENTOR
T. H. WILSON
BY Hazard and Miller
ATTORNEYS Patented Nov. 15, 1932

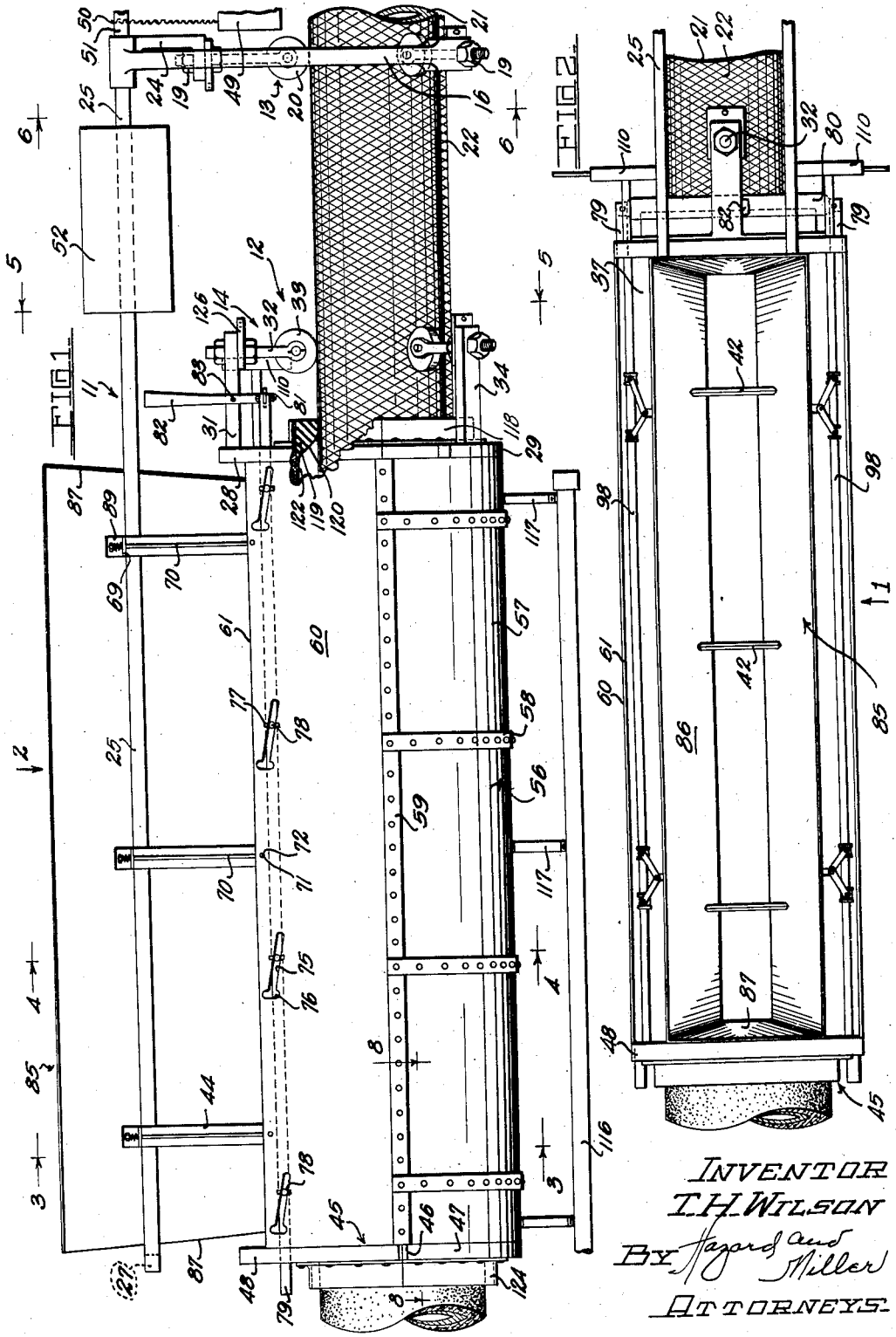

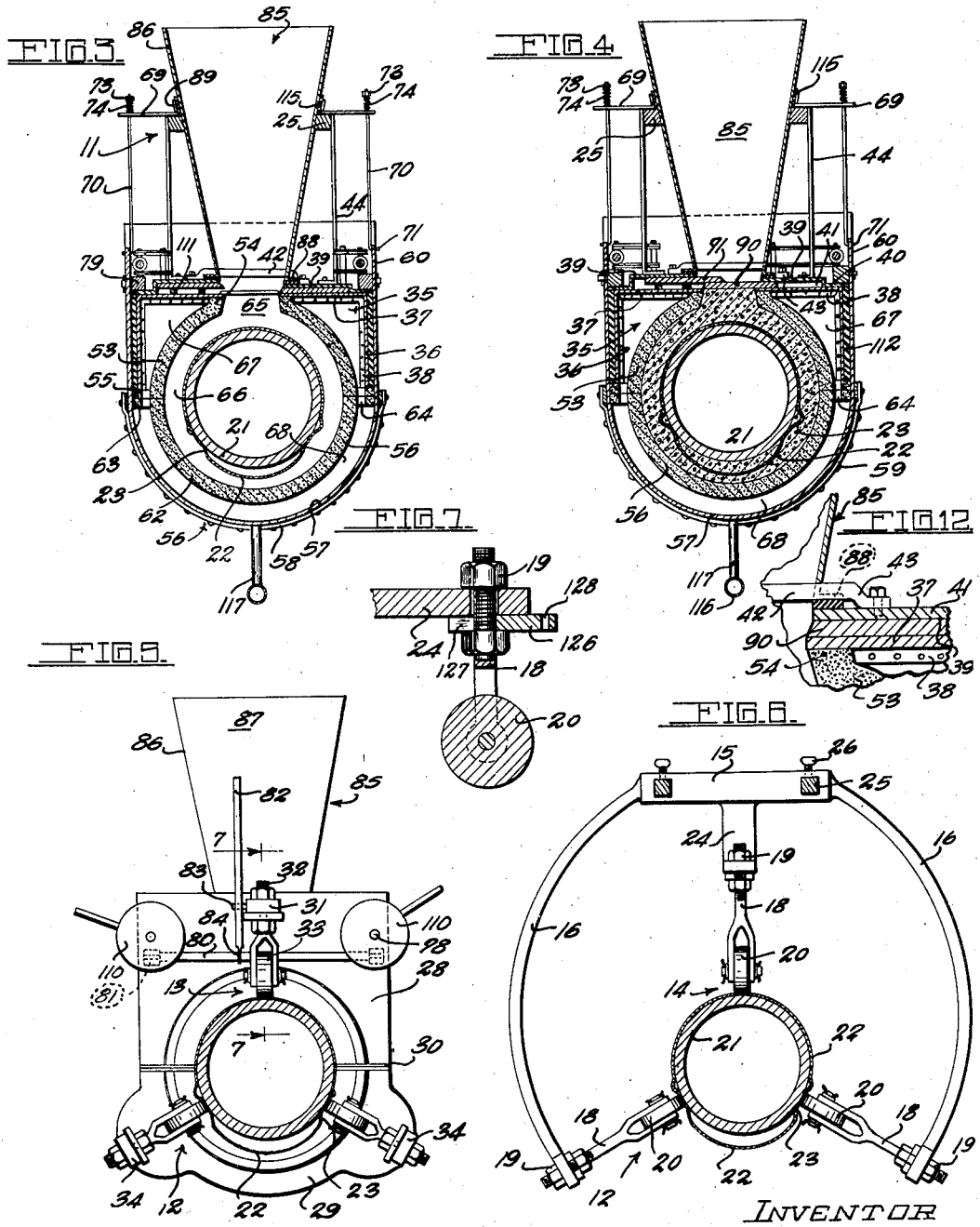

1,888,101

UNITED STATES PATENT OFFICE

THOMAS H. WILSON, OF LOS ANGELES, CALIFORNIA, ASSIGNOR, BY MESNE ASSIGNMENTS, TO VIBER COMPANY, LIMITED, OF LOS ANGELES, CALIFORNIA, A CORPORATION

METHOD AND APPARATUS FOR COATING PIPE WITH PLASTIC COMPOSITION

Application filed October 14, 1931. Serial No. 568,780.

In constructing long pipe lines such as are used for transmitting oil, gas, or water, it is desirable to cover or coat the pipe. In the usual procedure of laying such pipe, the various lengths are joined either by some type of a coupling or joint, or welded together. After this is done for a relatively long distance compared with the length of each section of pipe, the pipe is lowered in its permanent bed.

An object and feature of my invention is a method and apparatus for continuously coating the pipe with a plastic composition such as concrete. That is, one section is coated with the plastic composition and when this is initially set the apparatus is shifted longitudinally of the pipe to coat an adjacent section, and by a continuity of the procedure the pipe may be coated from one end to the other.

A further object and feature of my invention in this regard is the construction of an apparatus which may be used in a trench on long lengths of connected pipe sections to coat the pipe with a concrete covering, and after such concrete is set the pipe may be lowered to its permanent bed.

Another object and feature of my invention is subjecting the plastic composition before it is set, to a vacuum in the mold surrounding the pipe, this vacuum causing the withdrawal of surplus water from the plastic mixture and also operating to suck the occluded air from the composition.

In this connection a further detailed object of my invention is the employment of a sealing means at the end of the mold, which rests on a completed section of the coating and the other which surrounds the uncoated pipe, this sealing means preventing the entrance of air into the mold so that the suction is exerted on the outside of a porous mold and acts directly on the plastic composition poured in the mold.

Another object and feature of my invention is the construction of a mold formed in lower and upper sections, which may be clamped around the pipe to be coated, and in conjunction with the mold I use a carriage structure having wheels, which is adapted to roll on the uncoated pipe, this carriage or dolly structure giving the main support to the mold and holding such mold in the proper adjusted position in regard to the pipe.

In this connection, a further detailed feature is the use of an elongated hopper discharging the composition downwardly through an open longitudinal slot in the top of the mold.

Further features of my invention in regard to the mold and to dolly for supporting this, are retractible mountings for the dolly wheels to allow these to pass over welded or coupling joints, or other types of joints used in the pipe sections, and in a means for slightly separating the upper and lower sections of the mold to release the mold from a completed section to admit of moving the mold to an uncoated section of the pipe.

In this connection, a detailed feature of the mold and the end closure therefor provides for molding an overlapping joint in the plastic sections, these sections merging together at the joint, forming a continuous coating.

My invention is illustrated in connection with the accompanying drawings, in which:

Fig. 1 is a side elevation taken in the direction of the arrow 1 of Fig. 2 of my apparatus, showing a portion of uncoated pipe at one end and a section of coated pipe at the other end of the mold.

Fig. 2 is a plan taken in the direction of the arrow 2 of Fig. 1.

Fig. 3 is a vertical transverse section on the line 3—3 of Fig. 1 in the direction of the arrows, showing the hopper in communication with the mold.

Fig. 4 is a transverse vertical section on the line 4—4 of Fig. 1 in the direction of the arrows, illustrating the cutting knives for closing the hopper from the molded coating.

Fig. 5 is a transverse vertical section on the line 5—5 of Fig. 1 in the direction of the arrows.

Fig. 6 is a vertical transverse section on the line 6—6 of Fig. 1 in the direction of the arrows, showing an outer part of the dolly or carriage.

Fig. 7 is a detail view of one of the wheel mountings of the dolly.

Fig. 8 is a partial horizontal section on the line 8—8 of Fig. 1 in the direction of the arrows.

Fig. 9 is a horizontal section taken on the line 9—9 of Fig. 10 in the direction of the arrows.

Fig. 10 is a detail transverse section on the line 10—10 of Fig. 9 in the direction of the arrows, illustrating mainly the toggle actuating means for the knife blades.

Fig. 11 is a detail vertical transverse section on the line 11—11 of Fig. 9, showing a detail of the toggle operating collars.

Fig. 12 is an enlarged detail of parts shown in Fig. 4.

In my invention I employ a carriage construction, the assembly of which is designated generally by the numeral 11, and which has a dolly 12 consisting of an outer and an inner set of wheels 13 and 14. The outer set is illustrated in detail in Fig. 6 and employs a substantial cross bar 15 with arcuate bows 16 connected thereto. Each of these bows at the end has an opening with a wheel supporting shank 18 extending therethrough. This shank is threaded and has a set of nuts and lock nuts 19 for adjusting the shank. A wheel 20 is secured to the shank. These wheels run in a plane which is radial to the pipe 21, which is the pipe to be coated with the plastic or concrete covering. Such pipe is illustrated as having a fabric reinforcing 22 looped over such pipe, the wheels traveling on the fabric and operating in grooved sections 23 of the fabric. A center and vertical leg 24 is connected to the bar 15 and also has a shank with a wheel operating in a vertical plane. A pair of substantial longitudinal frame bars 25 extend rearwardly from the bar 15, through which bar they extend, and may be adjustable and securable by set screws 26 or the like. Such bars are joined at their rear end by a cross member 27.

The inner dolly member 14, illustrated particularly in Fig. 5, utilizes an upper rectangularly shaped plate 28 and a lower plate 29. These plates have flanges 30 and are bolted together. An upper rigid arm 31 extends forwardly from the upper plate adjacent the top and has an opening with a wheel supporting shank 32 extending downwardly, this shank having a wheel 33 operating in a vertical plane and being in alignment with the vertical wheel on the forward or outer dolly. A pair of lower arms 34 extend forwardly from the lower plate 29 and each of these is provided with a shank carrying a wheel. These shanks are screw threaded and are adjustable in the arms and may be clamped by a series of nuts and lock nuts.

The upper plate 28 has two lateral rigid structures connected thereto and extending longitudinally forming a support for the mold and also part of the mold. Such are designated generally by the assembly numeral 35. These structures comprise vertical plates 36 and horizontal plates 37. Such plates are connected by angles 38 to the front plate 28, or by any other suitable means of connection. The plates 37 do not extend completely across the structure, and positioned above the plates 37 there are upper plates 39. (Note Figs. 3, 4 and 12.) Such plates have an angular bent edge with a flange 40, such flange being secured to the plate 37, thereby spacing these plates and forming a longitudinal channel 41 between the plates 37 and 39, such channels being for severing knives or gates hereinunder described.

In order to secure the upper plates 39 on each side of the mold together, crossbars 42 are utilized, these having downwardly bent ends 43 with bolts securing the ends 43 to the plates 39. These plates are thus rigidly braced from one side to the other. The cross bars 42 are made sharp on the upper edge and may be triangular in shape. They are so designed that the concrete will pass readily over these bars without being interrupted in its downward flow from the hopper hereinunder detailed.

The connection between the bars 25 and the rigid mold structures 35 comprise a series of hanger straps 44 which are rigidly secured to the side frame bars 25 and to the upper plates 39. At the rear end of the mold, there is a divided rear end plate 45 of substantial strength. This plate has a horizontal split and is provided with flanges 46 bolting the upper and lower sections of the plate together. The lower section 47 of this plate may be substantially semi-circular on its periphery. The vertical plates 36 are secured to the upper section 48 of the end plate in any suitable manner as by angles similar to the connection 38. The upper plates 37 may also be secured to the upper end plate 48 in any suitable manner as by an angle connection. This construction gives a rigid mounting having the two distinct dollies each with their individual sets of wheels spaced a suitable distance apart, these wheels bearing, in effect, on the pipe to be covered, and such framing overhangs the pipe to a considerable distance, this depending on the length of the section which is to be covered by the plastic composition in one molding operation. In order to counterbalance the overhung carriage and the molds supported thereby, counterweights 49 should be suspended by chains 50 or the like from the forwardly projecting portions 51 of the longitudinal frame bars 25 and, in addition, these frame bars support adjustable sliding balancing weights 52. Such weights may be shifted longitudinally on the frame bars 25 and clamped into position in any suitable manner.

The mold is formed by upper mold sections 53 which are illustrated as formed of a porous rock-like substance, this preferably being a special composition which will allow the passage of air under suction, or screens may be utilized of sufficiently fine mesh or perforation to prevent passage of the fine material of the composition. Each of these mold sections has an upper rim 54 extending longitudinally of the mold and meeting the plate 37 at its inner edge. The upper mold sections each have a horizontal flange 55 secured in a suitable manner to the side plate 36. Thus the upper mold sections are formed rigid with the side structures 35 of the carriage and are shiftable therewith as a unit.

The lower mold section designated generally by the assembly numeral 56 has a lower sheet metal plate 57 with a series of semi-circular straps 58, these straps and the plate being attached to longitudinal rails 59, which rails are located in substantial alignment with the flanges 55 of the upper mold and with the horizontal diameter of the pipe when in molding position. The sheet metal plate 57 has upwardly extending sides 60 formed integral therewith and terminating at the top edge 61. Therefore, this lower mold may be formed of a single sheet metal member extending from the edge 61 and forming the sides 60 and the semi-circular portion 57 of the mold. Positioned inside of the semi-circular portion 57 there is a lower porous mold member 62, this being formed of a porous rock or a porous pressed composition or of a screen with suitably sized perforations or openings. This has a horizontal flange 63 aligning with the flange 55, such flange being secured to the upper portion of the semi-circular section 57 of the mold and the side plate 60 and also to the longitudinal rail 59. The flanges 63 and 55 have a series of air passages 64 spaced longitudinally to allow for the free action of the air suction. It will be seen, therefore, that the mold provides an open mouth 65 between the rims 54 of the upper mold sections, a mold space 66 between the pipe carrying its reinforcing and the porous sections of the mold and outside of the mold. There are the two open spaces 67 in each of the rigid upper parts 35 of the carriage and the semi-cylindrical space 68 between the lower portion 62 of the mold and the semi-cylindrical plate 57.

The lower section of the mold is suspended from the side frame bars 25 by providing a series of substantial brackets 69 secured to the rails 25, preferably over the hanger straps 44, and from these brackets there depend a series of lifting rods 70, each of these rods having a hooked end 71 engaged in a perforation 72 of the side plate 60 adjacent their top edge 61. These rods have heads 73 with coiled springs 74 bearing on the bracket 69 and engaging the heads. This forms a suspension means which allows dropping of the lower mold section when and for the purpose hereinunder described.

The clamping mechanism for attaching the upper and lower mold sections rigidly together during the molding operation comprises a series of sloping slots 75 formed in the side plate 60 of the lower mold. These have short vertical intersecting slots 76 through which heads 77 of wedging pins 78 may be inserted, the shanks of these pins sliding in the inclined slots 75. These pins are secured to slidable locking bars 79 which bear on the upper surface of the flanges 40 of the upper plates 39 forming part of the frame structure 35 of the carriage. These locking bars are shifted longitudinally by having an interconnecting cross rod 80 pivotally connected to the forward ends 81 of each of these bars. Connected to this cross bar there is an operating lever 82 pivoted on a fulcrum 83 secured to the arm 31 of the dolly 14 and having a loose pivotal connection 84 to the rod 80. Therefore, by pulling or pushing on the lever 82 the locking bars 79 may be shifted longitudinally, thus sliding the wedge pins 78 in the inclined slots 75. The action is in one position of these bars to pull the lower end of the mold up tightly into contact with the upper mold section, and when the locking bars are moved in the opposite direction the lower mold section will drop and when dropped is suspended in part by the rods 70. Such rods are designed to form a limit to the downward displacement of the lower mold section.

The pouring hopper 85 is illustrated as having sloping sides 86 and ends 87. Such hopper has a flange 88 on the bottom and the hopper has an opening at the bottom substantially the width of the opening 75 in the upper mold. The hopper is loosely mounted and rests and is supported on the frame rails 25, these being illustrated as beveled and, in addition, the brackets 69 may have an upturned flange 89. The cutting mechanism for severing the concrete poured into the mold from the residual amount in the hopper, such also forming a gate for the hopper when removing the mold, comprises a lower blade 90 and an upper blade 91. These both have relatively sharp edges, and such blades slide in the space 41 between the plate 37 and the plate 39 of the rigid sections of the upper mold part or carriage. (Note Figs. 3, 4, and 12.) Each of these blades has a toggle 93 comprising two links 94, which are pivoted together and to a common pivot 95 extending through the blades. The ends of these links are carried to threaded split collars designated 96 and 97 (note Figs. 9, 10, and 11). The collars 96 are non-shiftable on the screw shaft 98, there being two of these extending longitudinally of the mold and journaled in the opposite end plates or in any other suitable manner. These split sleeves are provided with collars 99, such collars having flanges 100 with a cylindrical section 101 therebetween. The non-slidable collars have a pin 102 extending therethrough. Over these collars are the split sleeves 103 having flanges 104 with bolts 105. From the split sleeves there are upwardly and downwardly projecting studs 106 having cylindrical sections 107 forming a pivot for the toggle links 94, these being held in place by cotter pins 108. The shafts 98 have threaded sections 109 and the portion 101 of the collar thereof is threaded so that on rotation of the screw the movable collar 97 is brought toward or from the non-shiftable collar 96 and thus by movement of the toggle links press the blades inwardly and at the same time give a shearing action. These shafts may be rotated by means of wheels 110 at the front end of the machine which are arranged to be actuated by suitable types of wrenches, such wheels preferably having wrench sockets for inserting a special wrench or any other suitable manner of rotating the shafts 98.

The blades are operated so that the lower blade 90 is used first to cut into concrete between the hopper and the mold and then the other shaft is operated to move the upper blade 91. This upper blade is supported on a series of blocks 111 supporting it on the sheet metal plate 37 in a position to slide on top of the lower blade.

In order to make the device substantially air tight, a rubber sheet 112 is fitted between the inner plate 36 and the outer plate 60. Such rubber at the bottom bears on the flanges 55 of the upper mold and engages the flange part 40 of the upper plates 39. There are rubber pads 113 (note Fig. 10) underneath the bottom flanges 88 of the side walls of the hopper. Also a rubber cushion layer 115 is fitted between the top rails 25 and the flanges 89 of the brackets 69. Thus the hopper, so far as vibration is concerned, is insulated from the mold part of the machine. This is on account of using a vibrator which may be of any suitable type and is preferably attached to the lower part of the mold to vibrate the concrete in the mold while it is undergoing its initial set, but it is desired to insulate the concrete in the hopper from this vibration as thoroughly as possible.

Suction pipes 116 are illustrated as extending along the bottom of the mold and being connected by nipples 117 which extend through the lower sheet metal plate 57. By this means an air suction or partial vacuum is created in the space outside of the porous mold or screen and operates to suck the occluded air from the concrete as well as withdraw the surplus water. This surplus water flows to the bottom part of the mold and is withdrawn through the nipples 117 in the pipe 116.

It is necessary to have an air and concrete seal at the forward end of the mold where it is over the mold pipe and for this purpose flanges 118, these being formed in split sections, are bolted to the front plate sections 28 and 29, and inside each of these is fitted a soft rubber gasket 119. This gasket has a bevelled cutout section 120 on the inside, the purpose of which, in part, is to form a curved bevel 121 on the end of the finished concrete mold on the pipe (note Fig. 8). This rubber gasket may have a fin 122 which forms the wedge-shaped outside end 123 of the molded concrete. This is to allow an overlapping lock to be made when one section is molded to overlap the finished section.

At the rear end of the mold secured to the plate 45 there are angles or flanges 124 and in these are fitted soft rubber gaskets 125. These gaskets bear on the finished section of concrete molded on a pipe and form a seal when the mold is advanced in position for casting another section. In initially starting molding the composition on the totally molded pipe, it is necessary to support the inner end of the mold by spacing blocks or the like and to use rubber gaskets of sufficient thickness to extend from the angles 124 to the molded pipe or, as an alternative, a short section of the pipe may be coated with a plastic composition by hand molded to the proper diameter for starting the molding of the pipe sections.

In order to readily displace the wheels for overriding flanges or wells in the pipe section, a washer 126 having a slot 127 therein is mounted on the shanks 18 between the nuts on the wheel side of the shanks. This washer may be readily pulled out, having a perforation 128 for engaging a suitable tool. (Note Fig. 7).

Various changes may be made in the details of construction without departing from the spirit or scope of the invention as defined by the appended claims.

I claim:

1. An apparatus for coating pipe comprising, in combination, a mold, means to support part of the mold on the uncoated pipe, a hopper for filling the mold with a composition, and means to sever the composition between the mold and the hopper.

2. An apparatus for coating pipe comprising a mold, means to support one end of the mold on the uncoated pipe, at a space therefrom, means for filling the mold with a composition, said supporting means being adapted to partly support the mold in shifting from a coated portion of the pipe to an uncoated portion.

3. An apparatus for coating pipe with a plastic composition comprising a carriage structure operating on the uncoated pipe, a mold connected to the carriage structure and partly supported thereby, the mold encircling the pipe, means for filling the mold with a composition, said mold having means to free same from the coating whereby the mold can be shifted from the coated to a section of the pipe which is uncoated.

4. An apparatus for coating pipe comprising a mold encircling a pipe and having means to space one end of the mold from the uncoated pipe, said mold being made in a plurality of longitudinal sections, means for filling the mold with a composition, and means to separate said sections of the mold when shifting the mold from a coated to a portion of the uncoated pipe.

5. An apparatus for coating pipe as claimed in claim 4, having in addition a carriage operating on the uncoated pipe and connected to the mold to partly support the mold in shifting such mold on the pipe and during the casting of the composition.

6. An apparatus for coating pipe comprising, in combination, a carriage structure adapted to be supported on the uncoated pipe, an overhanging frame, a mold having longitudinal sections suspended from the frame, a hopper for filling the mold also suspended from the frame, and means to separate one part of the mold from another for shifting longitudinally on the pipe.

7. An apparatus for coating pipe comprising, in combination, a carriage structure having wheels adapted to operate on an uncoated pipe, a frame connected to the carriage structure and overhanging the pipe to be coated, a mold having upper and lower sections suspended from the frame, means to space the mold from the pipe at the uncoated end, and means to form a seal on the coating at the other end, a hopper extending longitudinally of the mold, a movable cutting blade to sever the composition after pouring between the mold and the hopper and form a gate for the hopper, and means to separate the parts of the mold for shifting longitudinally of the mold.

8. An appartus for coating pipe as claimed in claim 7, the mold being formed with an inner porous structure and a space outside of said porous structure with means whereby a partial vacuum may be created in such space.

9. An apparatus for coating pipe comprising, in combination, a carriage structure having wheels adapted to run on an uncoated pipe, a frame extending from said carriage overhanging the pipe to be coated, a mold formed in an upper and a lower half section, the section extending longitudinally, said mold being suspended from the frame, locking bars extending longitudinally of the mold and having means to clamp the two sections of the mold tightly together or to release said sections to allow spacing apart for shifting the carriage and mold on the pipe, the upper section of the mold having a longitudinal opening, a hopper supported above the opening in the frame, and means to close said opening after coating a section of the pipe with the composition.

10. An apparatus for coating pipe as claimed in claim 9, the means to close the opening comprising a slidable knife between the upper mold section and the hopper, and means extending longitudinally of the mold and operable from one end to actuate said knife.

11. An apparatus for coating pipe as claimed in claim 9, the mold having a substantially semi-circular lower section with an inner mold surface formed of porous material, there being a space between such material and the outside of the mold, the upper mold section having an inside surface of porous material with longitudinally extending air spaces outside of said material, the spaces in the upper and lower sections of the mold being connected, and means whereby a partial vacuum may be created in such spaces.

12. An apparatus for coating pipe comprising, in combination, a carriage having an inner and outer dolly with wheels to engage the uncoated pipe, a frame comprising upper and lower sections extending from the carriage to one end to overlap the pipe to be coated, the lower section of the frame directly carrying and supporting an upper longitudinal section of a mold, the upper section of the frame having a lower longitudinally extended mold section suspended therefrom, a longitudinally extending locking bar with means to lock the upper and lower sections of the mold together for pouring the composition and to allow unlocking of said sections to permit dropping slightly of the lower section of the mold to permit longitudinal shifting of the mold to an uncoated section of the pipe, the mold having a longitudinal opening at the top with means for feeding a plastic composition therethrough.

13. An apparatus for coating pipe as claimed in claim 12, the means for feeding the composition comprising a hopper, a pair of knife blades positioned between the hopper and the upper section of the mold, one blade on each side, a pair of longitudinally extending shafts, one on each side of the mold, an operative connection from each shaft to a blade, and means to operate said shaft and said means to force the blade transversely of the hopper and the opening and at the same time give a shearing action to the blade.

14. An apparatus for coating pipe as claimed in claim 12, the end of the mold at the uncoated section of the pipe having a closure end shaped to give a reduced outside diameter to the coating whereby the sections of the coating may have an overlapping joint.

15. An apparatus for coating pipe comprising, in combination, a porous mold formed in a plurality of separable sections, a casing outside of such mold leaving a space for the formation of a partial vacuum, a connection for creating such vacuum, means to support the mold on an uncoated pipe for carrying part of the weight of the mold with the sections partly separated for shifting from a coated to an uncoated section of the pipe.

16. An apparatus for coating pipe comprising, in combination, a mold formed in a plurality of longitudinal sections, means to support one end of the mold on the uncoated pipe and spaced therefrom, such mold having an inner porous section and an outer section with an air space therebetween for formation of a partial vacuum, and a connection for establishing such vacuum, said supporting means being adapted to partly support the mold with the sections separated in shifting from a coated to an uncoated portion of the pipe.

17. An apparatus for coating pipe with a plastic composition comprising a carriage structure operated on a coated portion of the pipe, a mold connected to the carriage structure and partly supported thereby, said mold being formed in a plurality of longitudinal sections, each having an inner porous structure and an imperforate outer structure with an air space therebetween for the creation of a partial vacuum, and a connection for creating such vacuum, means for filling the mold with a composition, said mold having means to free the porous sections from a finished coating whereby the mold may be shifted from a coated to an uncoated section of the pipe.

18. An apparatus for coating pipe with a composition comprising, in combination, a carriage structure adapted to be supported on a mold pipe, an overhanging frame, a mold having longitudinal sections suspended from the frame and encircling the pipe, such mold having inner porous walls and outer imperforate walls with a space therebetween for formation of a partial vacuum, a hopper for filling the mold also suspended from the frame, means to cut off the composition in the hopper from the composition in the mold, and means to separate one part of the mold from another for shifting longitudinally on the pipe.

19. In the method of coating a pipe with a plastic composition, comprising casting the composition in a porous mold, surrounding the pipe and during such casting creating an air suction through the mold, then separating the parts of the mold and shifting the mold longitudinally of the pipe to extend over an uncoated section.

20. In the method of coating pipe with a plastic composition, comprising pouring the composition into the top of a mold, severing the composition at the place at which it is poured into the mold, creating an air suction exterior to the mold to withdraw air and water from the composition, separating parts of the mold, and shifting the mold to extend over a coated section of the pipe and an uncoated section.

In testimony whereof I have signed my name to this specification.

THOMAS H. WILSON.